US005142931A

United States Patent [19]

Menahem

[11] Patent Number: 5,142,931

[45] Date of Patent: Sep. 1, 1992

[54] 3 DEGREE OF FREEDOM HAND CONTROLLER

[75] Inventor: Israel Menahem, Clearwater, Fla.

[73] Assignee: Honeywell Inc., Minneapolis, Minn.

[21] Appl. No.: 655,740

[22] Filed: Feb. 14, 1991

[51] Int. Cl.[5] ........................ G05G 9/047; B64C 13/04

[52] U.S. Cl. ................................ 74/471 XY; 244/234; 244/236; 338/128

[58] Field of Search .................. 74/471 XY; 200/6 A; 244/234, 236; 338/128

[56] References Cited

U.S. PATENT DOCUMENTS

| | | | |
|---|---|---|---|
| 3,350,956 | 11/1967 | Monge | 244/234 X |
| 3,771,037 | 11/1973 | Bailey, Jr. | 318/580 |
| 4,012,014 | 3/1977 | Marshall | 74/471 XY X |
| 4,085,301 | 4/1978 | Smith | 200/4 |
| 4,132,318 | 1/1979 | Wang et al. | 214/1 |
| 4,150,803 | 4/1979 | Fernandez | 244/135 |
| 4,367,373 | 1/1983 | McDaniel et al. | 178/18 |
| 4,531,080 | 7/1985 | Nordstrom et al. | 318/628 |
| 4,555,960 | 12/1985 | King | 74/471 |
| 4,574,651 | 3/1986 | Nordstrom | 74/471 |
| 4,584,510 | 4/1986 | Hollow | 318/584 |
| 4,688,444 | 8/1987 | Nordstrom | 74/471 |
| 4,732,353 | 3/1988 | Studer | 244/165 |
| 4,738,417 | 4/1988 | Wenger | 74/471 XY X |
| 4,756,655 | 7/1988 | Jameson | 414/2 |
| 4,895,039 | 1/1990 | Hegg | 74/471 |
| 4,901,948 | 2/1990 | Panos | 244/23 |
| 4,913,000 | 4/1990 | Wyllie | 74/523 |
| 4,914,976 | 4/1990 | Wyllie | 74/523 |
| 4,916,622 | 4/1990 | Raman et al. | 364/459 |
| 4,921,293 | 5/1990 | Ruoff et al. | 294/111 |
| 4,947,701 | 8/1990 | Hegg | 244/236 X |
| 4,962,448 | 10/1990 | DeMaio et al. | 74/471 XY X |
| 5,007,300 | 4/1991 | Siva | 74/471 XY |

*Primary Examiner*—Allan D. Herrmann
*Attorney, Agent, or Firm*—Charles J. Ungemach

[57] ABSTRACT

A hand controller which includes a hand grip having therein a gimble mechanism for allowing rotatory motion about three axes which intersect in the interior of the hand grip and from which motion transmitting members allow the motions about the three axes to be transmitted to remote pick off devices and also along which force feedback signals may be fedback to the gimble structure to provide the correct "feel" for the grip.

22 Claims, 3 Drawing Sheets

Fig. 1
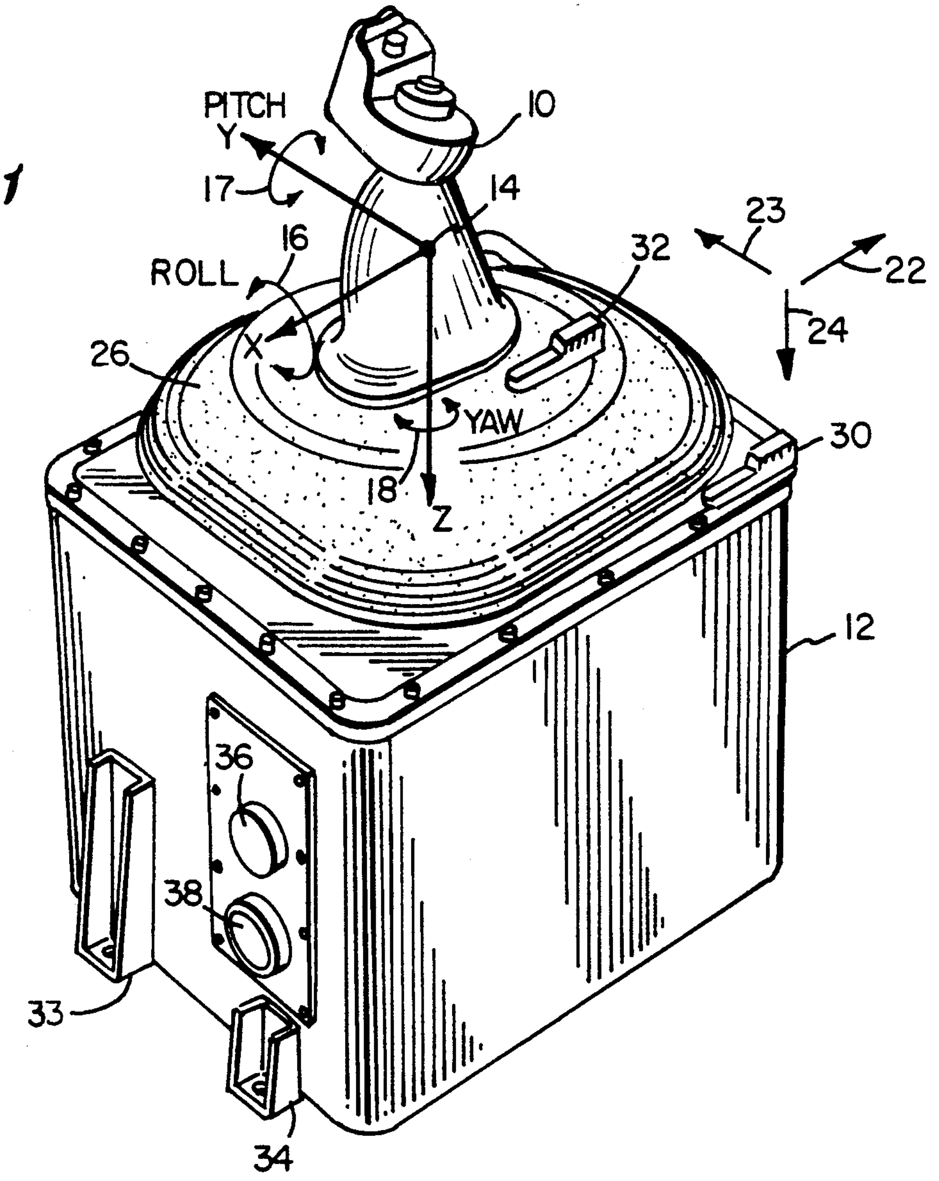
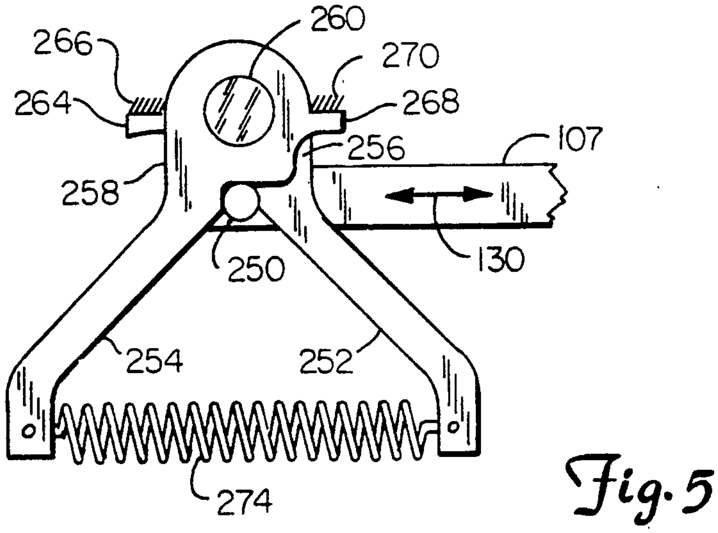
Fig. 5

3 DEGREE OF FREEDOM HAND CONTROLLER

UNITED STATES GOVERNMENT RIGHTS

The invention described herein was made in the performance of work under NASA Contract No. NAS9-18200, and is subject to the provisions of Section 305 of the National Aeronautics and Space Act of 1958, as amended [42 U.S.C. 2457].

BACKGROUND OF THE INVENTION

The present invention relates to controllers and more particularly to hand operated controllers for operating remote systems such cranes, robot arms, air or space craft, free flyers and the like.

A number of hand controllers exist in the prior art designed for controlling robots, air craft or space craft and having specific features useful for particular applications. For example, in the Wyllie U.S Pat. No. 4,913,000, Wyllie U.S. Pat. No. 3,914,976 and the Hegg U.S. Pat. No. 4,895,039 all assigned to the assignee of the present invention, a wrist action hand grip for 3 degrees of freedom and a forearm grip for providing additional degrees of freedom is shown and has special utility in helicopter control. Cross coupling between the hand controller and the forearm controller is avoided by having the hand controller mounted on the same apparatus that carries the forearm apparatus so that motion of the forearm does not effect motion of the hand and vice versa. The hand controller itself is described in the Wyllie patents as a standard prior art device and such grips like that shown in U.S. Pat. No. 4,895,039 above, usually do not have all three of the axes passing through a common point. Accordingly, some cross coupling can occur about the offset axis. Furthermore, mounting the hand controller at the end of the forearm control box, as shown in the above mentioned patents, provides a rather lengthy control mechanism which, in a space craft, extends too far into the space occupied by the user than may be desired.

While hand controllers having all three axes passing through a common point located within the hand grip itself are not completely unknown in the prior art as, for example, U.S. Pat. No. 4,555,960 issued to Michael King on Dec. 3, 1985, such controllers are faced with other difficulties which make them impractical. For example, because a hand controller grip is limited in size so as to accommodate the human hand, it has been heretofore impossible to get all of the mechanism necessary for producing control outputs and force feedback inputs to control three different degrees of freedom with the desired "feel" all within the hand grip itself. In the above mentioned King patent, the yaw axis has an extension from the hand grip to a remote housing where a large enough force feedback device could be located, but with regard to pitch and roll, tiny scissor/spring mechanisms are shown within the hand grip itself to attempt to provide force feedback for the pitch and roll axes. Unfortunately, they are too small to work effectively which is always the case because electric torque generating motors and scissor/ spring mechanism large enough for such purposes are too large to fit within the hand grip. When attempts are made to locate the force producing motors or scissor/spring mechanisms remote from the hand grip so that they can be large enough to provide the desired "feel", the pitch and/or roll axes are then also remote from the hand grip with the result that the three axes do not intersect inside of the hand grip and cross coupling can occur.

SUMMARY OF THE INVENTION

The present invention provides a 3 degree of freedom hand grip in which all three axes intersect within the cavity of the grip to prevent cross coupling and force feedback is provided from remotely located force producing devices through a unique connection arrangement to give the correct "feel" for pitch and roll. More specificaliy, the motions produced by the operator about the roll and pitch axes which intersect with the yaw axis in the hand grip are transferred via motion transmitting members which run from the grip down generally parallel to but displaced from the yaw axis to a housing located below the hand grip and through suitable mechanism therein operate to provide the necessary force feedback either from sufficiently large scissor/spring devices or torque generating motors. The suitable mechanism also includes a lever arm arrangement to provide for force multiplication. The same motion transmitting members may also be used to produce the required output signals. The housing itself may be designed to contain one or more additional degrees of freedom in a manner similar to that shown in the above mentioned Wyllie and Hegg patents although in the present invention the hand grip is mounted above the cabinet so that resulting apparatus is not as long as was the case in these patents and does not extend into the usable space of a space craft nearly as much.

BRIEF DESCRIPTION OF THE DRAWINGS

FIG. 1 shows an overall view of the hand controller mounted on a housing as contemplated in the present invention;

DETAILED DESCRIPTION OF THE PREFERRED EMBODIMENTS

Figure 2:
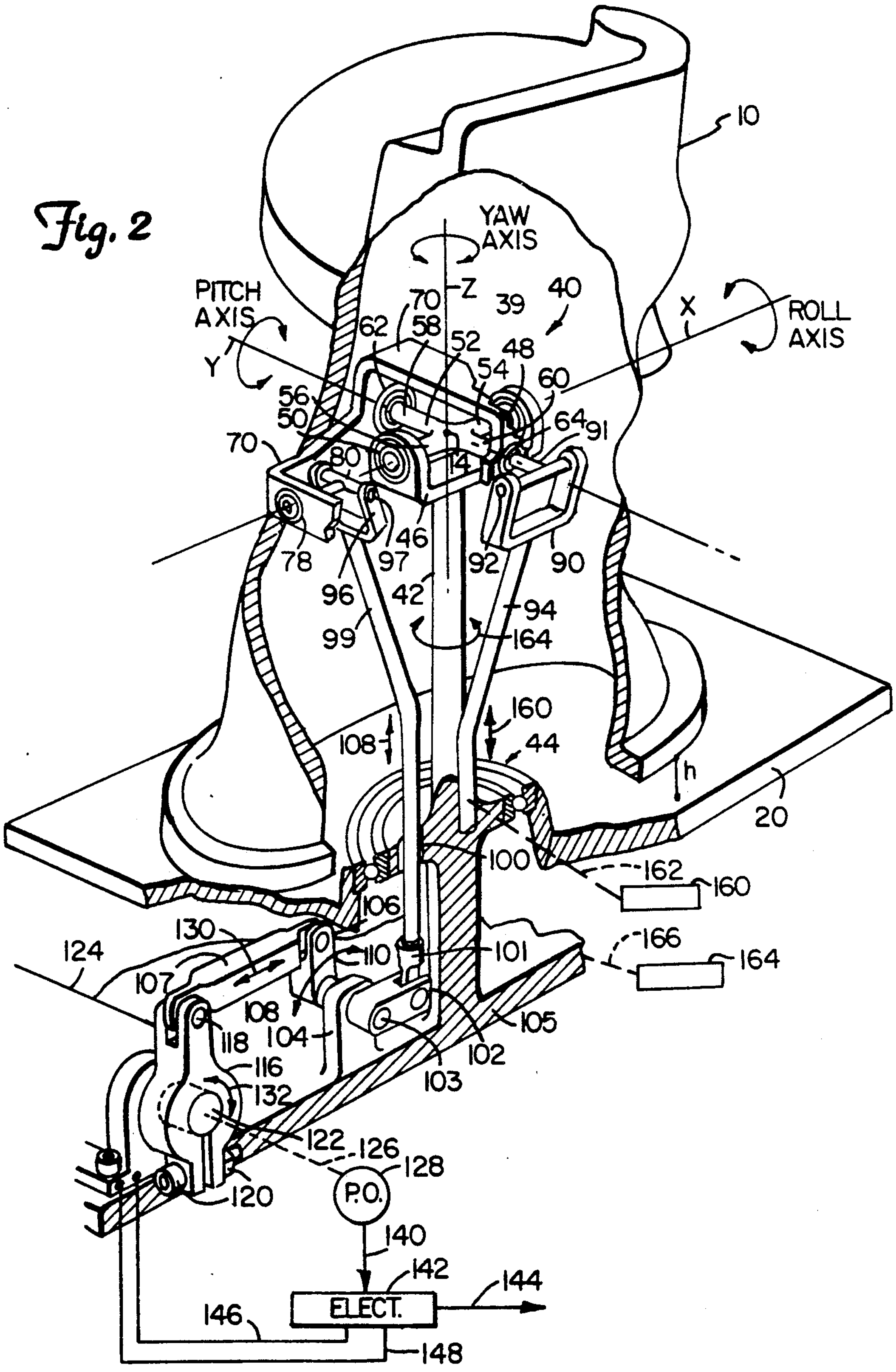
FIG. 2 shows a cutaway view of the hand controller and the three axes intersection contained therein and shows a schematic representation of electronics necessary to provide output signals and FIG. 3 is a schematic representation of the gimble mechanism 2; and, FIG. 4 is an schematic representation of an alternate gimble mechanism for use within the hand controller; and, FIG. 5 shows a scissor/spring device suitable for use in the present invention.

In FIG. 1, a three degree freedom hand controller grip 10 of the present invention is shown mounted on a housing 12 which in turn is attached to a frame such as the interior structure of a space station, (not shown). Unlike the prior art discussed above, the grip 10 is not mounted on a forearm holding device and accordingly, will not extend lengthwise as far into the cabin of the space craft as the prior art.

Hand grip 10 is adapted to be grasped by the hand of a controller and to move about three orthogonal axes, X, Y and Z, in a rotary fashion. The X, Y and Z axes may be considered the roll, pitch and yaw axes respectively, and are shown intersecting at a point 14 which is rather centrally located inside a cavity in the grip 10. When used to control a space craft or a free flying device, motion of the grip 10 about the three axes may be used to produce control of the roll, pitch and yaw motions of the craft respectively. In other words, pushing grip 10 to the right or the left about the X axis will produce a roll motion as shown by double ended arrow 16, pushing the grip 10 forward or backwards about Y axis will produce pitch motion as shown by double ended arrow 17 and twisting grip 10 about the Z axis will produce yaw motion as shown by double ended arrow 18. Because the three axes meet at a single point 14 there is no cross coupling between motions about any of the axes.

Grip 10 may be fastened to a movable member 20, (in a manner best seen in FIG. 2). Member 20 member may be mounted in housing 12 to move with the motions of the grip 10 in up to three linear directions shown by arrows 22, 23 and 24. The additional three degrees of freedom provided by motions along directions shown by arrows 22, 23 and 24 may be produced by a mechanism shown in the above mentioned Hegg and Wyllie patents or, in the preferred embodiment by apparatus shown in a co-pending application Ser. No. 07/738,255 filed Jul. 30, 1991 in the name of Israel Menahem and James Bacon which is assigned to the assignee of the present invention. The directions shown by arrows 22, 23 and 24 may be parallel to axes X, Y and Z, as shown, although this is not required. The movable member 20 (not seen in FIG. 1) is mounted to the housing 12 by a flexible cover 26 so as to permit the motion in all of the directions required for the hand controller, i.e., pitch, roll, yaw and, if desired, directions shown by arrows 22, 23 and 24. If member 20 is mounted for motion in a relatively frictionless manner, then a linear force produced by the operator's hand through point 14 along the X, Y, Z directions will produce linear motions along the directions shown by arrows 22, 23 and 24 respectively with no cross coupling to the motions about pitch, yaw and roll axes. If it is desired to use less than six degrees of freedom, locking switches such as shown in FIG. 1 with reference numeral 30 may be moved to prevent motion in the directions shown by arrows 22, 23 or 24, respectively. Alternately, or simultaneously, a locking switch shown with reference numeral 32 may be moved to prevent motion in the directions shown by arrows 16, 17 and 18 respectively.

In order to give the operator the proper "feel" for grip 10, it is customary to provide some sort of force feedback which opposes the motion produced by the operators hand. This force feedback can be a passive one such as is provided by scissor/springs described in the above mentioned U.S. Pat. Nos. 4,895,039 and 4,555,960 or by torque motors as will be described in connection with the preferred embodiment of the present invention as seen in FIG. 2.

Scissor/spring mechanisms and torque motors large enough to provide sufficient force occupy considerable amount of space and the interior of grip 10 does not have enough space to allow them to be placed therein. Accordingly, the force applying means for all three axes are located outside of the grip and the force is transmitted back to the grip through unique motion transmitting members and couplings. The force able to be applied is further enhanced by offsetting the force transmitting members for the pitch and roll axes so that a lever arm is produced as will be described in connection with FIG. 2. The motion transmitting members extend from the grip 10 into the housing 12 where there is sufficient room to accommodate larger scissor/springs or torque motors. The housing 12 is shown in FIG. 1 as having mounting members 33 and 34 attached to one side and these are used for attaching the housing to the craft where it is being used. Also shown are electrical connectors shown by reference numeral 36 and 38 which are used for bringing signals into and out of the housing 12 for use in control and feedback.

Referring now to FIG. 2, the hand grip located a distance "h" above plate 20 is shown in cutaway so as to expose a cavity 39 with a gimble arrangement 40 in the interior part thereof. A rotatable shaft 42 is shown extending along the Z or yaw axis outside of grip 10 through a bearing 44 in plate 20 and into the housing 12 (not shown in FIG. 2). A U-shaped yoke 46 is fastened to the end of shaft 42 and the upwardly extending ends thereof contain a pair of bearings 48 and 50 the centers of which lie along the X or roll axis. An "X" shaped member 52 has first and second legs 54 and 56 mounted in the inner race of bearings 48 and 50, respectively, for rotation about the X axis or roll axis. "X" shaped member 52 also has third and fourth legs 58 and 60 perpendicular to the first and second legs 54 and 56 and these are mounted in the inner race of a pair of bearings 62 and 64, respectively, for rotation about the Y or pitch axis. The legs 58 and 60 lie along the Y axis and, as mentioned, the legs 54 and 56 lie along the X axis while the rotatable shaft 42 lies along the Z axis so that, as seen, all three axes X, Y and Z meet at a point 14 in the center of the "X" shaped member 52.

Bearings 62 and 64 are mounted in a frame member 70 which extends over the top of and around the left side of "X" shaped member 52. On the left side, frame member 70 also is connected to the outer race of a bearing 78 the inner race of which is connected to a T-shaft 80. Bearing 78 and shaft 80 lie along the X axis. Frame member 70 is attached to the interior portion of the grip 10 and any motions of grip 10 imparted thereto by the operator will be passed to the frame 70 as will be described. It will be understood that grip 10 is loosely fastened to the housing 12 of FIG. 1 by a flexible cover 26 and that member 20 is mounted in housing 12 by a mechanism which permits motion in the directions 22, 23 and 24 with respect thereto. Accordingly, motions of member 20 in directions 22, 23 and 24 carry grip 10 along but motions of grip 10 about the roll, pitch and yaw axes are independent of member 20.

A U-shaped member 90 is rotatably attached to a T-shaft 91 through a pair of bearings 92. The T-shaft 91 extends into frame member 70 and is rotatably attached thereto by bearing 64. U-shaped member 90 is fixed to a motion transmitting shaft 94 which extends outside of grip 10 through an aperture in plate 20 (not seen in FIG. 2) so that motion transmitting member 94 may move up and down in a more or less parallel relationship to the Z axis. In similar fashion, a U-shaped member 96 is rotatably attached to the outer race of a pair of bearings 97 the inner race of which carries T-shaft 80. U-shaped member 96 is fixed to a motion transmitting shaft 99 which extends outside of grip 10 through an aperture 100 in plate 20 so that motion transmitting member 99 also moves up and down in a more or less parallel relationship to the Z axis. The aperture (not seen) for motion transmitting member 94 would be like aperture 100 for motion transmitting member 99. It should be noted that the upper ends of motion transmitting members 94 and 99 are offset from the Z axis by an amount which depends on the position of bearings 64 and 78 and this allows a greater force to be applied to the frame member 70 because of the lever arm equal to the offset distance. This distance can be varied by designing the frame member 70 for various offset distances so as to provide very accurate control of the feedback forces The gimble arrangement above described may also be seen in schematic form in FIG. 3 which will be described below.

Rotatable shaft 42 and motion transmitting shafts 94 and 99 are operable to bring motions of the gimble mechanism 40 out from the grip 10 down to signal pick off devices in housing 12 and to also bring feedback forces from torque motors in housing 12 back to the gimble device 40 as will now be described. For simplicity, only one such connection has been shown in FIG. 2. The shaft 99 is connected near its lower end to the inner race of a thrust bearing 101 the outer race of which is connected to an attachment member 102 the other end of which is connected to a shaft 103 which is journaled to an upright extension 104 of a plate 105 connected to and movable with the rotatable shaft 42. Thus, plate 105 and all the apparatus attached to it move with member 20 in the x, y and z directions and are rotatable about the Z axis with rotations of shaft 42.

Shaft 103, on the other side of extension 104, is connected to an upright extension 106 pinned to one end of a generally horizontal member 107. When shaft 100 moves up and down in FIG. 2, in a direction shown by a double ended arrow 108, such motion will be accompanied by a rotatory motion of member 102, shaft 103 and extension 106 in a direction shown by double ended arrow 110. The other end of horizontal member 107 is connected to a clamping device 116 by means of a journal 118. Clamping device 116 is tightened by means of a nut and bolt 120 so as to clamp to a shaft 122 connected to the rotor of a torque motor 124 mounted on plate 105. Shaft 122 is also connected by a mechanical connection shown by dashed lines 126 to a pick off device 128 which may be a resolver or variable resistance device, for example, and which operates to produce an output in accordance with rotation of shaft 122. It is seen that as member 102 rotates in a direction shown of arrow 110 member 107 will move back and forth in the direction shown by double ended arrow 130 which motion will impart rotatory motion to the clamping device 116, shaft 122, mechanical connection 126 and the pick off device 128 in a direction shown by double ended arrow 132. Rotation of pick off device 128 causes it to change its output. The output of pick off device 128 is shown by arrow 140 which is connected to various signal conditioning and amplifying circuits found in an electronics package 142. The amount of up and down motion of member 99 is thus converted to an output signal by the linkage above described and the pick off device 128. The electronics package 142 operates to produce a suitable output signal as shown by arrow 144 to control the crane, robotic device or the control surfaces or thrusters of a craft to be controlled (not shown).

Electronic package 142 also produces output signals on a pair of connections 146 and 148 which are presented to the torque motor 124 and are operable to produce torque on shaft 122 in proportion to the output of pick off device 128. Such torque will be in the opposite direction to the motion above described. Thus, torque motor 124 will produce an oppositely affecting torque through the clamping means 116, members 107, 106 and 102 to motion transmitting member 99 and back to grip 10 through bearing 78 and shaft 80 so as to produce a counter force on frame member 70 which force is enhance by the lever arm resulting from the off set of bearing 78 from the Z axis. More specifically, if the operator were to move his hand and grip 10 forward around the pitch axis Y, motion transmitting member 99 would move upwardly thus causing members 102 and 106 to move in a counter clockwise direction and member 107 would move to the left. This would cause clamping device 116 and shaft 122 to move in a counter clockwise direction and the signal produced by pick off device 128 would be fed back via electronics 142 and connections 146 and 148 to motor 124 to produce a counter acting torque on shaft 122 which would then tend to move fastening member 116 in a clockwise direction, member 107 to the right, members 106 and 102 in a clockwise direction and motion transmitting member 99 downwardly. Thus, the operator would sense resistance to the his motion around the pitch axis so as to give him the "feel" of the stick. This force will be significantly larger than previously possible because a larger motor can be used and because of the lever arm produced by the offset of bearing 78 from the Z axis.

While not described in connection with FIG. 2, similar torque motors and pick offs (shown by box 160 be connected in similar manner to motion transmitting shaft 94 as shown by dashed line 162 while rotatable shaft 42 may be direct drive connected to similar force generating means 164 by a connection shown by dashed lines 166. Accordingly, operator produced motions about the roll axis X and the yaw axis Z will also produce feedback torques to provide the proper "feel" to the grip 10 about all three axes.

It is also seen that when the operator moves grip 10 around the pitch axis Y, no motion of X-shaped member 52 results and accordingly, no motion of shafts 42 and 94. On the other hand, if the operator turns the grip 10 left and right about the roll axis X, then up and down motion of motion transmitting member 94 along the direction shown by arrow 160 results but since bearings 48 and 50 and shaft 80 lie along the roll axis X, no motion of shafts 42 and 99 result. Similarly, since plate 105 and all of the apparatus attached thereto turn with motion of grip 10 about the yaw axis, such motion, although carrying the "X"-shaped member 52 in a horizontal plane about the Z axis, does not produce up and down motion of either shafts 94 or 100. Thus cross coupling is avoided. When combinations of roll and pitch occur simultaneously, motion transmitting shaft 100 rotates about its central axis which therefore requires the thrust bearing 101 to be located on the linkage as shown in FIG. 2.

Figure 3:
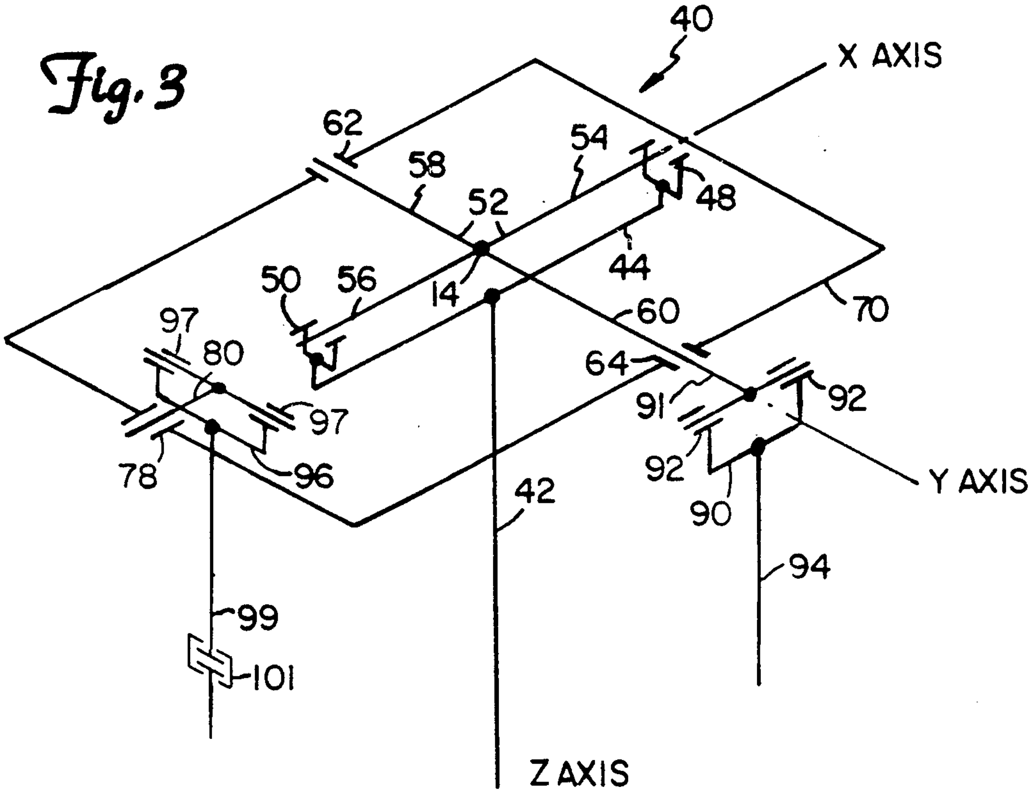

For clarity, the gimble arrangement of FIG. 2 is redrawn schematically in FIG. 3 and the same reference numerals used to describe like elements in FIG. 2 are employed. In FIG. 3 it is seen that the U shaped member 44 is carried by the vertical rotatable shaft 42 and carries the pair of bearings 48 and 50. The X shaped member 52 has legs 54 and 56 journaled in bearings 48 and 50 respectively and has legs 58 and 60 journaled in bearings 62 and 64 respectively carried by frame member 70. Bearing 78 is carried on the left side of frame member 70 and T-shaft 80 is journaled in the bearing 78. A U-shaped member 96 carries bearings 97 which rotatably hold the ends of T-shaft 80. U-shaped member 96 is connected to motion transmitting member 99 and member 99 extends through thrust bearing 101 a to the housing 12 as described above. In similar manner, motion transmitting member 94 is connected to U-shaped member 90 and, through bearings 92 is connected to T-shaft 91 which is journaled in bearing 64.

Figure 4:
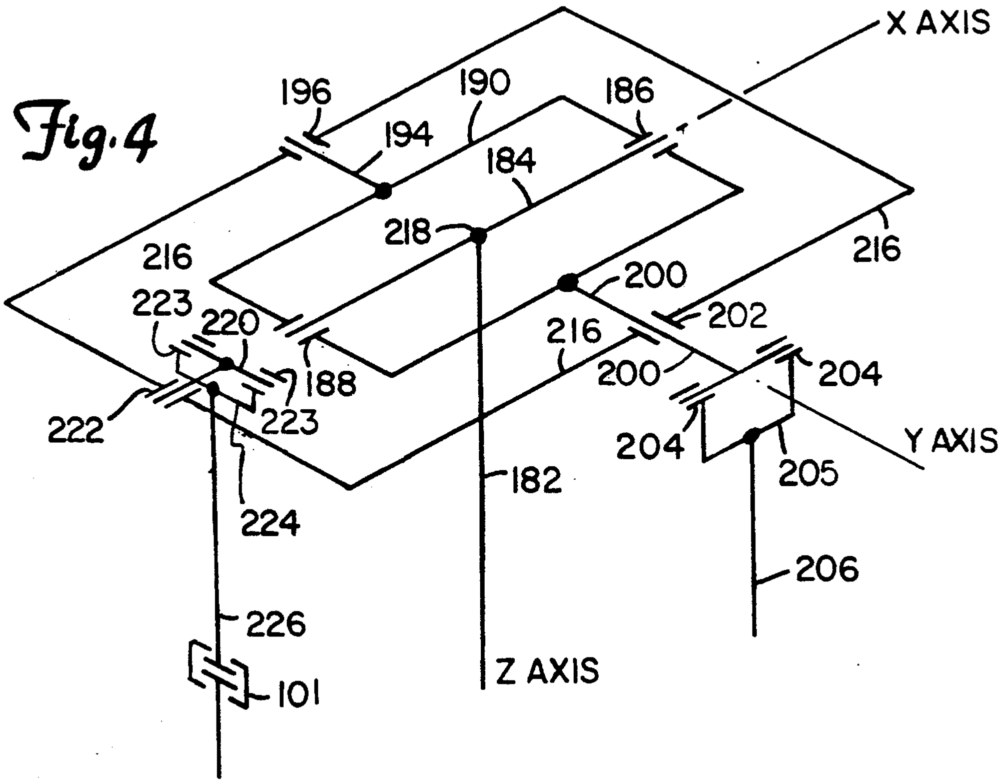

While the gimbled arrangement 40 shown in FIGS. 2 and 3 is the preferred embodiment, FIG. 4 shows an alternate arrangement in schematic form. In FIG. 4, a rotatable shaft 182 is shown connected to a cross bar 184 which passes through the center of bearings 186 and 188 mounted on a first rectangular shaped member 190. Bearings and 188 lie along the X axis. Half way around rectangular member 190 from bearing 186 and 188, a shaft extension 194 is connected through a bearing 196 and, on the opposite side, a T-shaft 200 is connected through a bearing 202. Bearings 196 and 202 lie along the Y axis. The T-shaft 200 is also journaled in the inner race of a pair of bearings 204 and a U-shaped member 205 is connected to the outer race of bearings 204. A shaft 206 is connected to U-shaped member 205 and comprises the motion transmitting member for the roll axis. On the left side of rectangular shaped member 216 is a T-shaft 220 which is connected to the inner race of a bearing 222 the outer race of which is connected to the rectangular shaped member 216. Bearing 222 is also along the X axis. T-shaft 220 is also journaled in a pair of bearings 223 and a U-shaped member 224 is connected to the outer race of bearings 223. A shaft 226 is connected to U-shaped member 224 and comprises the motion transmitting member for the pitch axis which extends down to the housing through the thrust bearing 101 as was the case in FIGS. 2 and 3. As seen, the cross bar 184, bearings 186 and 188 as well as bearing 222 lie along the X axis while bearings 196 and 202 lie along the Y axis. Rotatable shaft 182 lies along the Z axis and all three axes intersect at a common point 218 which will be inside a grip like grip 10 of FIGS. 1 and 2. Similarly to the arrangement shown in FIG. 2 the outer O-shaped member 216 would be fastened to the grip 10 and it is seen that motion from left to right about the X axis will produce motion of transmitting member 226 up and down but produce no motion of motion transmitting member 228 or rotatable member 182. Similarly, pitch motion around the Y axis will cause up and down motion of motion transmitting member 226 but no motion transmitting member 206 or rotatable member 182. Finally, the yaw motion around axis Z will produce rotatory motion of shaft 182 about the Z axis but no up and down motion of transmitting members 206 and 226 although they will rotate around the Z axis as was the case in FIG. 2. As in the previous gimble arrangement, the forces applied by the motion transmitting members 206 and 226 are passed down to a housing where sufficiently large force producing devices can be located. The arrangement may be the same as described in connection with FIG. 2. Finally, as seen, the feedback forces applied through transmitting members 182 and 226 are multiplied with a lever arm which exists because of the offset of bearings 202 and 222 from the Z axis.

In place of the electronic package 142 connections 146 and 148 and torque motor 124 along with the various connections described in connection with FIG. 2 to provide a force feedback, the spring/scissors mechanism of FIG. 5 may be employed. In FIG. 5, the horizontal member 107 movable int he direction shown by double ended arrow 130 comprises the same elements as were used in connection with FIG. 2. Member 107 is connected to a pin 250 which lies between a leg 252 and a leg 254 of independently rotatable members 256 and 258 respectively, mounted on a shaft 260. Member 256 has a horizontal extension 264 which normally bears against an abutment shown by hash lines 266 and member 258 has a horizontal extension 268 which normally bearings against an abutment shown by hash lines 270. The lower ends of legs 252 and 254 are joined by a tension spring 274 which operates to normally hold the legs in a closed position around pin 250. However, as member 107 moves in either of the directions 130 this motion will be accompanied by one of the legs 252 or 254 moving away from the position shown and acting against the tension of spring 274 to rotate around shaft 260. As it does so the force of spring 274 will increase so as to put an increasing feedback tension on member 170 and thus give the "feel" feedback to the operator.

It is therefore seen that I have provided a unique three degree of freedom hand controller operable to impart motion around first, second and third axes which intersect in the center thereof so as to avoid cross coupling and from which connection members extend to motion pick off and feedback devices located where they have more room to be mounted. It is also seen that the feedback forces can be very accurately adjusted by careful design of the offset lever arms and that the apparatus is compact in size and will not extend unnecessarily into the space usable by space pilots in the cockpit of their craft. Many changes will occur to those skilled in the art. For example, other gimble arrangements may be devised and couplings to provide force feedback from the remote housing to the gimble arranged. The U-shaped members such as 90, 96 205 and 224 attached to the motion transmitting members may be located on opposite sides from the positions shown in the drawings or, on both sides if desired. In fact, the motion transmitting members may be cables in which case it may be preferable to have connections on both sides of the gimble arrangements. The pick offs, while shown remotely located in the preferred embodiment may be placed in the grip as was done in the above mentioned U.S. Pat. No. 4,555,960 and while they may be potentiometers or resolvers, as described, may alternately be other types of signal transducers. It is therefore seen that although the present invention has been described with reference to preferred embodiments, workers skilled in the art will recognize that changes may be made in form and detail without departing from the spirit and scope of the invention.

What is claimed is:

1. Three degrees of freedom hand controller apparatus including a grip for use by a controller's hand to produce output motion representative of turning motion of the hand about first, second and third mutually perpendicular axes intersecting at a point inside the grip, comprising:

first rotatable means (46) mounted within the grip for rotation about the first axis when the controller's hand moves the grip about the first axis;

second rotatable means (52) mounted within the grip on the first rotatable means for rotation about the second axis when the controller's hand moves the grip about the second axis;

third rotatable means (70) mounted within the grip on the second rotatable means for rotation about the third axis when the controller's hand moves the grip about the third axis;

first motion transmitting means connected to the first rotatable means and extending outside the grip to transmit rotary motion of the first rotatable means;

second motion transmitting means connected to the second rotatable means and extending outside the grip to transmit rotary motion of the second rotatable means; and third motion transmitting means connected to the third rotatable means and extending outside the grip to transmit rotary motion of the third rotatable means.

2. Apparatus according to claim 1 further including signal producing means connected to the first, second and third motion transmitting means to produce an electrical signal indicative of the motion of the first, second and third rotatable means about the first, second and third axes respectively.

3. Apparatus according to claim 1 wherein the first motion transmitting means comprises a first elongated member (42) fixed to the first rotatable member and extending generally along the first axis, the second motion transmitting means comprises a second elongated member (94) connected to the second rotatable member and extending generally parallel to the first axis and the third motion transmitting means comprises a third elongated member (99) connected to the third rotatable member and extending generally parallel to the first axis.

4. Apparatus according to claim 3 wherein the motion transmitted by the first elongated member is rotary, and the motions transmitted by the second and third elongated members is linear, the signal producing means operates to convert rotary motion to electrical signals and further including modifying means to convert the linear motion transmitted by the second and third motion transmitting means to rotary motion for use by the signal producing means.

5. Apparatus according to claim 1 wherein the three degree of freedom hand controller is connected to member means that is mounted for low friction linear movement in a first direction, a force applied to the grip generally through the point of intersection of the three axes causing motion of the member means along the first direction without motion of the grip about the first, second or third axis.

6. Apparatus according to claim 1 further including force feedback means connected to the first, second and third motion transmitting means and operable to provide a force tending to oppose any motion of the first, second and third rotatable means about the first second and third axes respectively.

7. Apparatus according to claim 6 wherein the force feedback means comprises first, second and third scissor spring mechanisms (FIG. 5) connected to the first, second and third motion transmitting means respectively.

8. Apparatus according to claim 6 wherein the force feedback means comprises first, second and third electric motors (124, 160 and 166) connected to the first, second and third motion transmitting means respectively.

9. Apparatus according to claim 8 further including signal producing means connected to the first, second and third motion transmitting means respectively to produce electric output signals indicative of rotation of the first, second and third rotatable means about the first, second and third axes respectively, and the first, second and third electric motor means receive the electrical signals from the signal producing means to apply forces in accordance therewith to the first, a second and third motion transmitting means respectively.

10. A three degree of freedom hand controller which minimizes cross coupling between rotations about three mutually perpendicular axes by having the axes intersect at a point interior of the hand controller and which permits motions about the three axes to be transmitted exterior of the hand controller, comprising:

a first member (46) mounted on a first mechanical connection means (42) which rotates about the first axis;

a second member (52) gimbled to the first member and rotatable about the second axis, the second member including second mechanical connection means (94) connected thereto and extending exterior of the hand controller so as to transmit motion of the second member in a direction generally parallel to the first axis; and a third member gimbled (70) to the second member and rotatable about the third axis, the third member including third mechanical connection means (99) connected thereto and extending exterior of the hand controller so as to transmit motion of the third member in a direction generally parallel to the first axis.

11. The hand controller of claim 10 further including first, second and third transducers (142, 160 and 166) operable to convert mechanical motion to electrical output signals, each transducer mounted external to the hand controller and connected to one of the first, second and third mechanical connection means respectively.

12. The hand controller of claim 11 wherein the motion of the first mechanical connection means is rotary, the motions of the second and third mechanical connection means are linear and further including coupling means to convert the linear motions of the second and third connection means to rotary motions and wherein the first, second and third transducer are of the type which convert rotary motion to electrical signals.

13. The hand controller of claim 11 further including member means movable in at least one direction parallel to the plane of the second and third axes connected to the hand controller, motion of the hand controller in a direction parallel to the one direction causing movement of the member means in the one direction.

14. The apparatus of claim 13 wherein the first, second and third transducers are mounted on the member means.

15. The apparatus of claim 11 further including first, second and third force feedback means connected to the first, second and third mechanical connection means respectively to produce forces therein tending to oppose the motion of the first, second and third members about the first, second and third axes respectively.

16. The apparatus of claim 15 wherein the force feedback means comprises first, second and third scissor spring mechanisms (FIG. 5).

17. The apparatus of claim 15 wherein the force feedback means comprises first, second and third electric motors (124, 160 and 166) connected to receive the electric signals and produce forces in accordance therewith.

18. A three degree of freedom controller including hand grip means having an interior cavity (39) therein;

first mechanical motion transmitting means (42) rotatable about a first axis and extending from inside the cavity to a position remote from the hand grip means;

a first yolk fixed to the first mechanical motion transmitting means and in the cavity, the first mechanical motion transmitting means operable to transmit motion to and from the first yolk about the first axis;

a second yolk gimbled to the first yolk for rotation in the cavity about a second axis perpendicularly intersecting the first axis at a point;

a third yolk gimbled to the second yolk for rotation in the cavity a bout a third axis perpendicularly intersecting the first and second axes at the point;

second mechanical motion transmitting means (94) connected to the second yolk inside the cavity and extending remote from the grip to transmit motion to and from the second yolk about the second axis; and third mechanical motion transmitting means (99) connected to the third yolk inside the cavity and extending remote from the grip to transmit motion to and from the third yolk about the third axis.

19. Apparatus according to claim 18 further including transducing means located remote from the grip, connected to the first, second and third mechanical motion transmitting means respectively and operable to produce first, second and third electrical signals indicative of the motions of the first, second and third yolks about the first second and third axes respectively.

20. Apparatus according to claim 19 further including member means mounted for movement in at least a first direction parallel to the plane of the second and third axes, the member means connected to carry the grip and having the transducing means mounted therein.

21. Apparatus according to claim 20 wherein a force imparted to the grip and directed generally through the point produces motion of the member means along the first direction.

22. Apparatus according to claim 19 further including force feedback means connected to the first, second and third mechanical motion transmitting means to provide motions thereto of magnitude corresponding to the electrical signals from the first, second an third transducing means and of direction to oppose any motions of the first, second and third yolks about the first, second and third axes respectively.

* * * * *

UNITED STATES PATENT AND TRADEMARK OFFICE

CERTIFICATE OF CORRECTION

PATENT NO. : 5,142,931

DATED : September 1, 1992

INVENTOR(S) : ISRAEL MENAHEM

It is certified that error appears in the above-identified patent and that said Letters Patent is hereby corrected as shown below:

Col. 10, line 31, delete "transducer", insert "transducers"

Col. 11. line 5, delete "a bout", insert "about"

Signed and Sealed this

Twenty-first Day of December, 1993

*Attest:*

BRUCE LEHMAN

*Attesting Officer*

*Commissioner of Patents and Trademarks*